H. THUN.
SURFACE MEASURING MACHINE PARTICULARLY INTENDED FOR THE MEASUREMENT OF LEATHER.
APPLICATION FILED DEC. 7, 1920.

1,402,118.

Patented Jan. 3, 1922.
2 SHEETS—SHEET 1.

Inventor
Hermann Thun
By Knight Bros
Attys

H. THUN.
SURFACE MEASURING MACHINE PARTICULARLY INTENDED FOR THE MEASUREMENT OF LEATHER.
APPLICATION FILED DEC. 7, 1920.
1,402,118.
Patented Jan. 3, 1922.
2 SHEETS—SHEET 2.
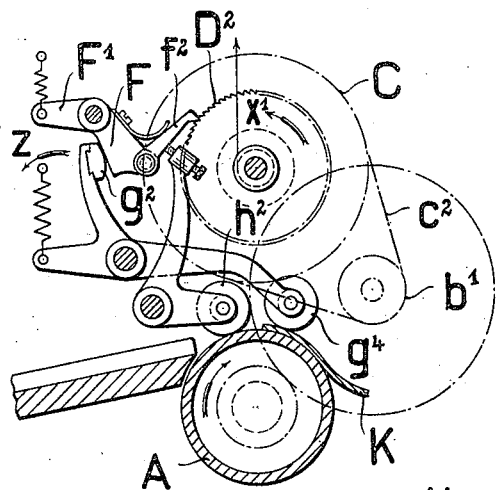
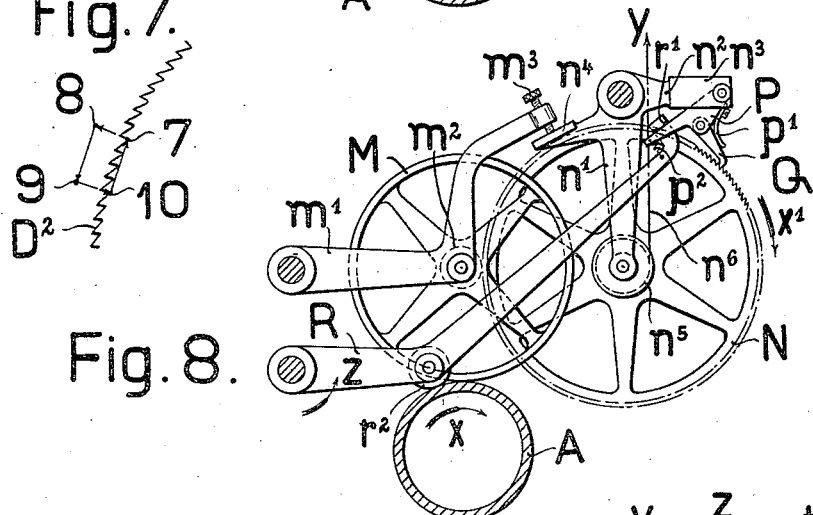
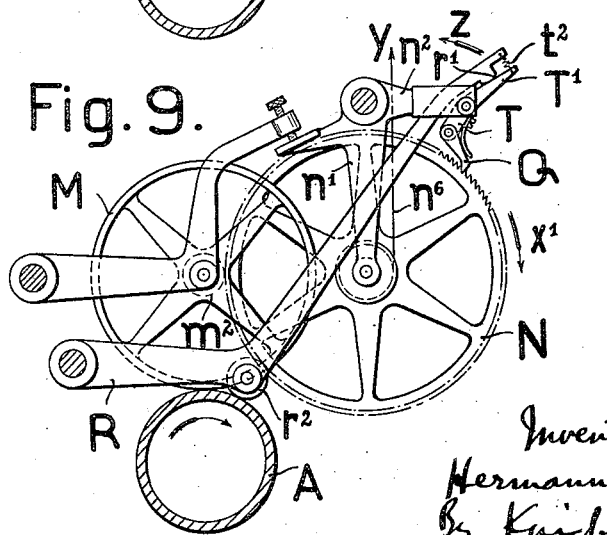

UNITED STATES PATENT OFFICE.

HERMANN THUN, OF ESSEN, GERMANY, ASSIGNOR TO FRIED. KRUPP AKTIEN-GESELLSCHAFT, OF ESSEN-ON-THE-RUHR, GERMANY.

SURFACE-MEASURING MACHINE PARTICULARLY INTENDED FOR THE MEASUREMENT OF LEATHER.

1,402,118.     Specification of Letters Patent.     Patented Jan. 3, 1922.

Application filed December 7, 1920. Serial No. 429,026.

*To all whom it may concern:*

Be it known that I, HERMANN THUN, residing at Essen, Germany, a citizen of the German Republic, have invented a certain new and useful Improvement in Surface-Measuring Machines Particularly Intended for the Measurement of Leather, (for which I have filed application in Germany Sept. 6, 1919,) of which the following is a specification.

This invention relates to that class of surface measuring machines particularly intended for the measurement of leather, in which bodies lying upon a backing can be lifted off such backing and when lifted off cause an indicating apparatus to be thrown into operation. The object of this invention is to improve surface measuring machines of this class.

The invention will be described with reference to the accompanying drawings which show four constructions of the invention.

Figure 1:
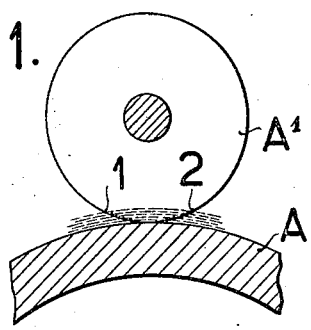
Figure 2:
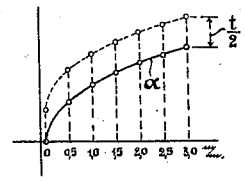
Figure 3:
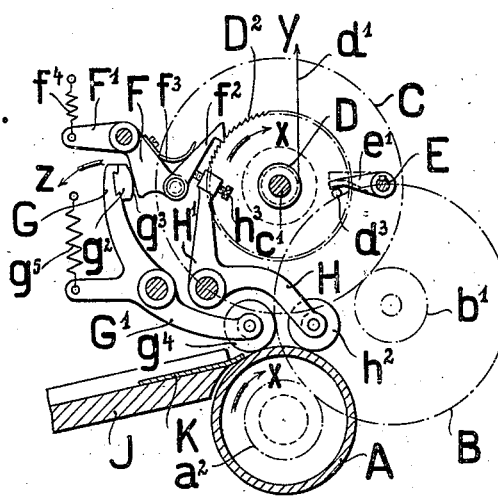
Figure 5:
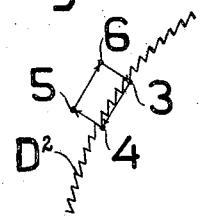
Figure 4:
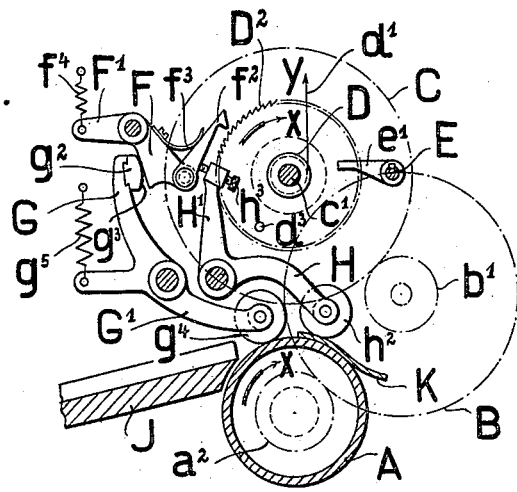

Fig. 1 is a fragmentary view illustrative of the old principle upon which this invention is an improvement, Fig. 2 is a diagrammatic view, Figure 3 is a side elevation of the first construction, Figure 4 is the same view as Figure 3 with certain parts in a different position, Fig. 5 is a diagrammatic view, Figure 6 is a side elevation of the second construction, Fig. 7 is a diagrammatic view, Figure 8 is a side elevation of the third construction and Figure 9 is a side elevation of the fourth construction.

In the leather measuring machines hereinbefore mentioned, which are employed for the measurement of the surface area of large pieces of leather, the bodies which lie on the backing (a roller A) and can be lifted off it are in general formed by rollers $A^1$ (see Figure 1). Between the roller A, which is conveniently constructed as a driving roller and rotates in a clockwise direction, and the rollers $A^1$ is passed the leather which is to be measured, and when doing so the rollers $A^1$ are lifted by the leather off the roller A. The lifting of a roller $A^1$ and with it the throwing into action of the indicating apparatus begins the moment the leather has come into contact with the particular roller $A^1$ that is to say e. g. at the point 1 in Figure 1, while the roller $A^1$ only comes into contact with the roller $A^1$ again and consequently throws the indicating apparatus out of action when the leather leaves the roller at the point 2. The indicating apparatus therefore remains in action too long and, as can easily be seen from Figure 1, indicates an amount which is too great and which is proportional to that part of the periphery of the roller $A^1$ which lies between the points 1 and 2. This amount, the so-called error of thickness, is consequently the greater the thicker the leather to be measured is, and it increases according to a curve (see Figure 2) the abscissæ of which denote the thickness of the leather; In addition to this error of thickness, there is also generally a further error, which is independent of the thickness of the leather. In the usual kind of measuring machines the indicating apparatus is in communication with a ratchet wheel, which is locked at the conclusion of the measuring operation by a pawl. If at this moment the pawl should happen to be opposite the point of a tooth, the ratchet wheel, notwithstanding its engagement with the pawl, can still rotate one tooth division $t$ and according to the arrangement either in the same direction in which it rotated previously or in the opposite direction. This produces the so-called tooth error which is transmitted to the indicating apparatus. If at the moment above mentioned the lowest point of the gap between two teeth be opposite the pawl the ratchet wheel immediately comes to a standstill and the error in this case is equal to zero. The mean tooth error is therefore equal to $\frac{t}{2}$ (see Figure 2). The total error is therefore equal to the error of thickness increased or diminished by the mean tooth error.

After these introductory remarks the first construction shown in Figures 3 and 4, will be described first.

The driving roller A which rotates in the direction of the arrow $x$ is positively connected through a toothed wheel gearing $a^2$, B, $b^1$ with a gear wheel C, which is mounted on a shaft $c^1$. On this latter are mounted to rotate and at equal distances apart a number of disks D, every two of which are connected by a band $d^1$ with one measuring element (not shown) of an indicating apparatus provided with a scale dial so that rotation of a disk D in the direction of the arrow $x$ results in the rotation in the same direction of the scale dial. When the various parts are in the position illustrated in Figure 3 the scale dial is in its zero position. A weight (likewise not shown) which acts on the scale dial exerts a pull in the direction of the arrow $y$ on the band $d^1$. Each of the disks D is rigidly connected to a ratchet wheel $D^2$, which is coupled to the shaft $c^1$ by a friction clutch (not shown). The ratchet wheel $D^2$ carries a pin $d^3$ which bears against a lever $e^1$ (see Figure 3), which lever $e^1$ is mounted on a shaft E, which can be rotated to a small extent in a clockwise direction. With the teeth of the ratchet wheel $D^2$ there engages a pawl $f^2$ (see the point 3 in Figure 5), which is adapted to prevent rotation of the disk in one direction or the other. The pawl $f^2$ is pivotally mounted on one arm F of a double armed lever F $F^1$ and is acted upon by a flat spring $f^3$. The arm F is acted upon by a spring $f^4$ and bears against the face $g^3$ of a stop piece $g^2$ which is curved in accordance with a certain law, and which stop piece $g^2$ is mounted on one arm G of a double armed lever G $G^1$. Its other arm $G^1$ carries a roller $g^4$ under pressure, which bears upon the driving roller A under the action of a powerful spring $g^5$. Looking in the direction of the arrow $x$ it will be seen that a second roller $h^2$, which is mounted on one arm H of a double armed lever H $H^1$ and which corresponds to the roller $A^1$ is located behind the pressure roller $g^4$ on the driving roller A. The other arm $H^1$ of the double armed lever H $H^1$ carries a set screw $h^3$ which bears against the pawl $f^2$ in the manner shown in the drawing. In front of the roller A is mounted a guide J, which serves to receive the leather to be measured (K) and of which only a portion is shown in the drawing.

When the surface area of the leather K is to be measured, the lever $e^1$ is first brought into the position shown by dot and dash lines in Figure 3. Any rotation of the ratchet wheel $D^2$ which might be possible under the action of the pull acting in the direction of the arrow $y$ is first prevented by the engagement of the pawl $f^2$. After the lever $e^1$ has been moved into position the leather K is pushed on to the roller A in the direction of the arrow $x$ and then passed through between the roller A and the pressure rollers $g^4$. This causes the particular rollers $g^4$, which act similarly to a tracer, to be raised by the leather K from the roller A and the more so the thicker the leather K is. The stop piece $g^2$ is at the same time moved in the direction of the arrow $z$ (see Figure 3), which movement is followed under the spring $f^4$ by the arm F of the lever F $F^1$ together with the pawl $f^2$. This latter carries the ratchet wheel $D^2$ and the disk D connected to it with it, and rotates it therefore in the opposite direction to that indicated by the arrow $x$ and its nose moves from the point 3 in Figure 5 to the point 4. By means of the weight (not shown) the scale dial is also rotated out of its zero position in the opposite direction to that indicated by the arrow $x$. The extent of this rotation is dependent, as will at once be seen, on the thickness of the leather K, the curvature of the surface $g^3$ and the ratio of transmission of the lever arms G and $G^1$. The apparatus is therefore so constructed and in particular the curvature of the surface $g^3$ is made of such a configuration that the extent of the aforesaid rotation of the scale dial is equal to the amount by which it rotates too much on the subsequent measuring operation which rotation in excess is caused, as hereinbefore explained, by the errors of thickness and gearing. The measuring operation proper is initiated the moment when the leather K comes into contact with the roller $h^2$ on the continued rotation of the roller A and lifts the said roller $h^2$ off the roller A (see point 1 of Figure 1). When the roller $h^2$ is lifted off the roller A the set screw $h^3$ presses the pawl $f^2$ out of the particular gap between two teeth, so that the nose of the pawl $f^2$ moves from the point 4 to the point 5 (see Figure 5). This causes the ratchet wheel $D^2$ to be released and to be now carried along in consequence of the friction clutch provided between it and the shaft $c^1$ by this latter in the direction of the arrow $x$. The rotation of the ratchet wheel $D^2$ is transmitted through the medium of the band $d^1$ to the scale dial of the indicating apparatus, which now rotates continuously also in the direction of the arrow $x$ and in proportion to the surface area of the leather passing through (see Fig. 4). Shortly before the conclusion of the measuring operation the leather K slides out from under the roller $g^4$ so that this latter can again bear on the roller A. When this takes place, the pawl $f^2$, which is even now still out of engagement with the ratchet wheel $D^2$ is moved in the direction of the arrow $x$ without acting on the ratchet wheel $D^2$, its nose moving from 5 to 6 (see Figure 5) back again. The moment the end of the leather K reaches the point on the periphery of the roller $h^2$ which corresponds to the point 2 in Figure 1, the roller $h^2$ also drops back onto the roller A and the pawl $f^2$ consequently drops back onto the teeth of the ratchet wheel $D^2$ (its nose moving from the point 6 to the point 3 again in Figure 5). The ratchet wheel $D^2$ accordingly rotates still by a mean amount which is equal to $\frac{t}{2}$ and is then prevented from rotating any further, and so concludes the measuring operation. As the scale dial of the indicating apparatus has been rotated backwards prior to the measuring operation proper by an amount equal to the amount by which it was rotated too much during the measuring operation proper the indicating apparatus indicates the exact surface area of the leather K with the elimination of the errors of thickness and tooth.

In the apparatus above described it will be seen from the foregoing description that an error compensating device G $G^1$ $g^2$ $g^3$ $g^4$ $g^5$ is provided for each disc D and as there are two discs D connected to each measuring element, there are two error compensating devices for each measuring element. The leather measuring machine may however be simplified by providing only a single error compensating device for each measuring element or a group of measuring elements. In this case the stop piece $g^2$ may be extended for such a distance that the arm F of the double armed lever F $F^1$ corresponding to the particular measuring elements or the particular group of measuring elements lies or bears upon the said stop piece $g^2$ and the roller $g^4$ may also with advantage be constructed as a corresponding wide roller. The working of this construction can be understood at once without further description and consequently no further explanation is required.

In the second construction shown in Figure 6, the rotation of the gear wheel $b^1$ is transmitted to the gear wheel by a sprocket chain $c^2$, so that the ratchet wheel $D^2$, after the pawl $f^2$ has been thrown out of operation, is rotated by the roller A in the opposite direction as in the first construction that is to say in the direction of the arrow $x^1$. In other respects the only difference between the second construction and the first one is that the roller $g^4$ is located behind the roller $h^2$ and that the parts E, $e^1$, $d^3$ are eliminated.

When a piece of leather K passes over the roller A in the construction shown in Figure 6, it first lifts the roller $h^2$ and thereby throws the pawl $f^2$ out of operation (the nose of this latter moving from the point 7 in Figure 7 to the point 8) so that the indicating apparatus is consequently thrown into operation at once. When the leather K reaches the roller $g^4$ and lifts it off the roller A the stop piece $g^2$ moves in the direction of the arrow $z$, and the arm F of the lever F $F^1$ follows on the nose of the pawl $f^2$, without acting on the ratchet wheel $D^2$, moving from the point 8 to the point 9 (see Figure 7). At the moment the ratchet wheel $D^2$ comes to a standstill the indicating apparatus indicates an amount which as has been hereinbefore explained, is too much by the amount which corresponds to the errors of thickness and gearing. When however the end of the leather K slides out from under the roller $g^4$, so that this latter lies upon the roller A this causes the stop piece $g^2$ to rotate the pawl $f^2$ and this latter to rotate the ratchet wheel $D^2$ in the opposite direction to that indicated by the arrow $x^1$. The nose of the pawl consequently moves from the point 10 to the point 7 again (see Fig. 7). On this rotation of the ratchet wheel $D^2$ the scale dial is also rotated backwards, and the apparatus being so constructed that the amount by which the scale dial is rotated backwards, is equal to the amount by which it was rotated too much during the measuring operation proper owing to the errors of thickness and gearing. At the conclusion therefore the indicating apparatus again indicates the surface area of the piece of leather K.

As in the above described arrangement the backward rotation of the ratchet wheel $D^2$ only takes place at the conclusion of the measuring operation, there is no necessity to provide a stop lever which is capable of taking up two different positions. It is sufficient to provide one fixed stop, which prevents the scale dial when rotated back into the zero position, from being rotated any further beyond this position.

The third construction shown in Figure 8 will now be described. Upon a roller A at equal distances from each other bear a number of revolving discs M, each of which is carried by a pivotally mounted lever $m^1$ and is rigidly connected to a gear wheel $m^2$. Each gear wheel $m^2$ has opposite to it a gear wheel N which is constructed in the form of a ratchet wheel on one section of its circumference and is carried by one arm $n^1$ of a double armed rocking lever $n^1$ $n^2$ and adapted to cooperate with the corresponding gear wheel $m^2$. The other arm $n^2$ of the lever $n^1$ $n^2$ carries a weight $n^3$, which acts on the gear wheel M in the direction of the approach of the gear wheel N. The gear wheel N is so adjusted by means of a set screw $m^3$, which is mounted on the free end of the lever $m^1$ and bears against a projection $n^4$ on the lever $n^1$ $n^2$, that it is still just out of engagement with the toothed wheel $m^2$. The gear wheel N is rigidly connected to a disc $n^5$ which is again connected by a band $n^6$ in the manner hereinbefore described with a scale dial of an indicating apparatus. To the arm $n^2$ of the lever $n^1$ $n^2$ is pivoted a lever P, on which a pawl Q is mounted to rotate. This pawl Q engages under the action of a flat spring $p^1$ in the teeth of the gear wheel N and is so constructed that it allows the gear wheel N to rotate in the direction of the arrow $x^1$ only.

The free end of the lever P is under the action of a spring $p^2$, which is fixed on the one hand to it and the other hand to a rocking lever R and bears on a stop face $r^1$, which is provided on the free end of the lever R and is curved in accordance with a certain law. At its central part the lever carries a roller $r^2$ which bears on the roller A and looking in the direction of the arrow $x$ lies in front of the disc M.

When the surface area of a piece of leather is to be measured the leather must be run over the roller A. To enable this to be done the roller $r^2$ is first lifted and the lever R rotated with its stop face in the direction of the arrow $z$. This movement is followed by the lever P, the pawl Q and also by the disc $n^5$ and the gear wheel N under the action of the pull exerted on the band $n^6$ in the direction of the arrow $y$, these latter rotating in the opposite direction to that indicated by the arrow $x^1$. By this means the indicating apparatus is again actuated in a manner similar to that in which it is by the rotation of the ratchet disc $D^2$ of the first construction when the roller $g^4$ is lifted off the roller A. Shortly after the roller $r^2$ has been lifted the disc M is also lifted by the leather from the roller A, so that the set screw $m^3$ moves away from the projection $n^4$. This movement is taken up by the lever $n^1$, $n^2$, under the action of the weight $n^3$ and the gear wheel engages with the gear wheel $m^2$, which rotates under the influence of the leather running over the roller A in a counter clockwise direction and consequently now produces the rotation of the gear wheel N and the disc $n^5$ in the direction of the arrow $x^1$. The pawl Q does not prevent this rotation of the gear wheel N. The measuring operation proper is consequently initiated. When the end of the leather slides out from under the roller $r^2$ this latter once more bears upon the roller A. When this movement takes place the pawl Q cannot exert any action on the gear wheel N, as this latter is still in engagement with the gear wheel $m^2$. The moment the end of the leather arrives at the point on the periphery of the disc M which corresponds to the point 2 in Figure 1, the disc M again bears upon the roller A and the set screw $m^3$ brings the gear wheel N out of engagement with the gear wheel $m^2$. As a rule the gear wheel N does not come to rest at this moment, but continues to rotate under the action of the force attached to the band $n^6$ and acting in the direction of the arrow $y$ as can be seen at once, such rotation taking place in the mean by half the pitch of the tooth and in the opposite direction to that indicated by the arrow $x^1$. When the measuring operation proper is carried out therefore the gear wheel N is rotated by an amount which is too much which error corresponds to the error of thickness diminished by the error of tooth. The apparatus is therefore so devised that the gear wheel N is rotated backwards by that amount when the roller $r^2$ is lifted off the roller A so that at the conclusion the indicating apparatus again indicates the exact surface area.

The fourth construction (see Figure 9) differs principally from the one just described by the fact that the roller $r^2$ is located behind the disc M on the roller A. Furthermore the arm $n^2$ of the lever $n^1$ $n^2$ has mounted upon it instead of a one-armed lever a double armed lever T $T^1$ one arm T of which carries the pawl Q and the other arm $T^1$ of which bears against the stop face $r^1$ of the lever R under the action of a tension spring $t^2$. In other respects the construction of the apparatus is the same as in the construction shown in Fig. 8.

When measuring up a piece of leather the disc M is first raised by the leather and connection thereby established between the gear wheels $m^2$ and N. The indicating apparatus is consequently thrown into operation at once. Shortly afterward the roller $r^2$ is lifted off the roller A and the stop face $r^1$ is therefore moved in the direction of the arrow $z$, which movement the lever T $T^1$ tends to follow under the action of the spring $t^2$ and at the same time to move the pawl Q in the direction of the arrow $x^1$. In consequence of the engagement however of the two gear wheels $m^2$ and N the movement of the pawl Q and consequently that of the lever T $T^1$ is dependent on the rotation of the gear wheel N, which latter however rotates naturally more slowly than the pawl Q tends to move in the direction of the arrow $x^1$. In consequence hereof the spring $t^2$ is at first stressed and the arm $T^1$ of the lever T $T^1$ follows the stop face $r^1$ slowly in accordance with the rotation of the gear wheel N. Finally, the arm $T^1$, without the pawl Q having been able to exert any action on the gear wheel N, again bears against the stop face $r^1$. The moment the leather reaches the point on the periphery of the disc M which corresponds to the point 2 in Figure 1, the disc M once more bears upon the roller A and the gear wheels $m^2$ and N are brought out of engagement. The gear wheel N rotates then still under the action of the force attached to the band $n^6$ and acting in the direction of the arrow $y$ by an amount which is equal in the mean to half the pitch of the tooth and in the opposite direction to that indicated by the arrow $x^1$. When therefore the end of the leather runs out from under the roller $r^2$ this latter also again bears upon the roller A. The stop face $r^1$ now bears upon the arm $T^1$ of the lever T $T^1$ and affects the rotation of this latter in the opposite direction to that indicated by the arrow $z$. The pawl Q also executes a movement at the same time in the opposite direction to that indicated by the arrow $x^1$ and the gear wheel N follows this movement under the action of the pull exerted on the band $n^6$ in the direction of the arrow $y$. The apparatus is again so constructed that by this means the errors of thickness and gearing are compensated so that finally the indicating apparatus indicates the exact surface area.

Claims:

1. A measuring machine of the class described for use in connection with an indicating apparatus comprising means operable by the material to be measured for causing the indicating apparatus to be moved in the measuring direction and means operable by the material to be measured for causing the indicating apparatus to be moved in the opposite direction.

2. A measuring machine of the class described comprising a driving roller, two sets of pressure rollers, cooperating with said driving roller to feed the material to be measured through the machine, means for operating an indicating apparatus, means operable by one set of said pressure rollers for causing the driving means of the indicating apparatus to be actuated in one direction, means operable by the other set of pressure rollers for causing the indicating apparatus to be moved in the opposite direction.

3. A surface measuring machine of the class described comprising a driving roller, two sets of pressure rollers engaging said driving roller, driving disks for operating an indicating apparatus, said sets of pressure rollers being displaceable away from said driving roller by the passage of the material to be measured through the machine, means associated with each driving disc for causing the same to be actuated in one direction, said means being operatively connected to one of said sets of pressure rollers and a corresponding number of means operated by the other set of pressure rollers for causing said driving discs to move the indicating apparatus in the opposite direction.

4. A measuring machine of the class described comprising a driving roller, two sets of displaceable pressure rollers bearing against said driving roller, a multiplicity of driving discs for operating an indicating apparatus, a pawl and ratchet mechanism associated with each driving disc, a double-armed lever for each pawl and ratchet mechanism, one arm of said lever pivotally supporting its associated pawl, double-armed levers supporting one set of said pressure rollers, stop-pieces carried by the other ends of said levers and bearing against said first mentioned levers, springs normally keeping said double-armed lever in engagement with its stop-pieces, said pawl and ratchet mechanisms being disengageable by the other set of pressure rollers, said first mentioned set of pressure rollers cooperating to move said driving disc in a direction to operate said indicating apparatus opposite to its measuring direction.

5. A measuring device of the class described comprising a driving roller, two sets of displaceable rollers engaging said driving roller, driving discs for operating an indicating apparatus, a series of control devices for said discs connected to one set of said pressure rollers and operated by their displacement, a stop-piece engaging said series of control devices and operatively connected to the other set of pressure rollers whereby upon displacement of said other set of pressure rollers, said control device will be operated to cause said indicating apparatus to be moved in a direction opposite to its measuring direction.

6. A measuring device of the class described comprising a driving roller, driving means for an indicating device, pawl and ratchet mechanisms for controlling said indicating device driving means, a set of displaceable rollers bearing normally against said driving roller, means connecting said set of pressure rollers to said pawl and ratchet mechanisms whereby the same may be disengaged, double armed levers associated with said pawl and ratchet mechanisms, one arm of said double armed levers pivotally supporting the pawls of said pawl and ratchet mechanisms, a stop-piece engaging said double-armed levers and means displaceable by the material to be measured for moving said stop piece whereby said indicator operator means will be actuated to cause said indicator to move in a direction opposite to its measuring direction.

7. An apparatus of the class described comprising a driving roller from which the material to be measured is adapted to be passed, a rotatable shaft for supporting said driving roller, a second rotatable shaft operatively connected to said first mentioned shaft and rotating similarly thereto, a series of discs on said second shaft for operating an indicating device, pawl and ratchet mechanisms associated with said driving discs for controlling the same, a set of displaceable pressure rollers normally engaging said driving roller, means operatively connecting said pressure rollers to said pawl and ratchet mechanisms whereby said pawl and ratchet mechanisms may be disengaged upon the displacement of said pressure rollers, a stop-piece engaging said pawl and ratchet mechanisms, spring means tending to normally hold said stop-piece and pawl and ratchet mechanisms in engagement and displaceable means normally engaging said driving roller and displaceable by the material to be measured for moving said pawl and ratchet mechanisms in such a manner that said driving disks will move the indicating apparatus in a direction opposite to its measuring direction.

8. A leather measuring device of the class described comprising a driving roller, a set of displaceable pressure rollers, means for operating an indicating device, means operatively connecting said set of displaceable pressure rollers to said indicating device operating means, a tracer bar carrying a roller disposed in front of said set of pressure rollers and displaceable for operating said tracer bar, said tracer bar cooperating with said indicator operating means for correcting the movement imparted to said indicating apparatus.

9. An arrangement of the class described for measuring leather, comprising a driving roller rotatably mounted, a rotatable shaft adapted to be rotated similarly to said driving roller, driving disks on said shaft adapted to operate an indicating device, ratchet wheels associated with said driving disks adapted to control their movement, a set of displaceable pressure rollers engaging said driving roller and displaceable therefrom by the material to be measured, pawls associated with said ratchet wheels, means operatively connecting said set of pressure rollers to said pawls whereby they are disengaged upon displacement of said pressure rollers, a pivotally mounted tracer bar carrying a roller adapted to engage said driving roller and likewise displaceable therefrom, means carried by the upper end of said tracer bar for engaging the pawls of said pawl and ratchet mechanism, stops carried by said ratchet wheels, cooperating adjustable stops adapted to contact the stops on said ratchet wheels to limit the movement of said ratchet wheels in one direction, said adjustable stops being movable to provide two positions of rest for said ratchet wheels, substantially as and for the purpose described.

10. An apparatus of the class described comprising a driving roller, a set of pressure rollers engaging said driving roller and displaceable therefrom, indicating apparatus driving means, ratchet wheels associated therewith and controlling the operation of said driving means, control devices connected to and operated by said pressure rollers, a displaceable member engaging said driving roller, a stop-piece operated by said displaceable member, said stop-piece engaging said control means, said stop-piece causing said control means to move said ratchet wheels in a direction to correct the reading of said indicating apparatus, the contact face of said stop-piece being so curved that its action on the indicating apparatus is proportional to the pitch of the teeth of said ratchet wheel.

The foregoing specification signed at Essen, Germany, this 10th day of August, 1920.

HERMANN THUN.

In presence of—
HANS GOTTSMANN,
CARL MÜLLER.